United States Patent
Ikuro

(10) Patent No.: US 9,423,027 B2
(45) Date of Patent: Aug. 23, 2016

(54) CONTROL APPARATUS FOR CONTINUOUSLY VARIABLE TRANSMISSION

(71) Applicant: HONDA MOTOR CO., LTD., Minato-ku, Tokyo (JP)

(72) Inventor: Ayae Ikuro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/767,842

(22) PCT Filed: Feb. 3, 2014

(86) PCT No.: PCT/JP2014/052426
§ 371 (c)(1),
(2) Date: Aug. 13, 2015

(87) PCT Pub. No.: WO2014/125949
PCT Pub. Date: Aug. 21, 2014

(65) Prior Publication Data
US 2016/0003354 A1     Jan. 7, 2016

(30) Foreign Application Priority Data
Feb. 18, 2013   (JP) .................................. 2013-028948

(51) Int. Cl.
*F16H 59/42*     (2006.01)
*F16H 61/662*    (2006.01)
*F16H 59/44*     (2006.01)

(52) U.S. Cl.
CPC .......... *F16H 61/66236* (2013.01); *F16H 59/42* (2013.01); *F16H 59/44* (2013.01); *F16H 61/662* (2013.01); *F16H 61/66259* (2013.01)

(58) Field of Classification Search
None
See application file for complete search history.

(56) References Cited

U.S. PATENT DOCUMENTS

| 6,027,425 | A | 2/2000 | Sakaguchi et al. |
| 6,029,107 | A * | 2/2000 | Sato .................. F16H 61/66259 477/120 |
| 6,602,163 | B2 | 8/2003 | Tamura et al. |
| 2003/0064855 | A1 * | 4/2003 | Tanaka .................... F16H 59/42 477/115 |
| 2004/0098988 | A1 * | 5/2004 | Goi .......................... F02C 7/36 60/772 |

FOREIGN PATENT DOCUMENTS

| JP | H06-174022 A | 6/1994 |
| JP | H07-71547 A | 3/1995 |
| JP | H11-198686 A | 7/1999 |
| JP | 2001-330128 A | 11/2001 |

* cited by examiner

*Primary Examiner* — Edwin A Young
(74) *Attorney, Agent, or Firm* — Carrier Blackman & Associates, P.C.; William D. Blackman; Fulchand P. Shende

(57) ABSTRACT

The apparatus is configured to compare the calculated value (NDRCMDZ) of the desired input shaft rotational speed with the desired input shaft rotational speed upper limit (#NDRC-MDMX) set in relation to an energy supply cut-off rotational speed (NEFC), determine the desired input shaft rotational speed upper limit (#NDRCMDMX) as the desired input shaft rotational speed (NDRCMD) when it is determined that the calculated value (NDRCMDZ) does exceed the desired input shaft rotational speed upper limit, and determine the calculated value (NDRCMDZ) as the desired input shaft rotational speed (NDRCMD) when it is determined that the calculated value does not exceed the desired input shaft rotational speed upper limit (#NDRCMDMX).

6 Claims, 4 Drawing Sheets

CONTROL APPARATUS FOR CONTINUOUSLY VARIABLE TRANSMISSION

TECHNICAL FIELD

This invention relates to a control apparatus for a continuously variable transmission.

BACKGROUND ART

As disclosed in Patent Document 1, for example, a control apparatus for a continuously variable transmission calculates, at every control cycle, in accordance with at least the travel speed of the vehicle, a desired input shaft rotational speed NDRCMD to be inputted from a drive source (engine) through an input shaft to a continuously variable transmission, and feedback-controls the transmission ratio (speed ratio) such that the input shaft rotational speed NDR actually inputted becomes equal to the desired input shaft rotational speed.

PRIOR ART REFERENCES

Patent References

[Patent Reference 1]
Japanese Laid-Open Patent Application No. Hei-11 (1999)-198686

SUMMARY OF INVENTION

Problems to be Solved by the Invention

In this regard, when the rotational speed of the drive source exceeds a rotational speed defining require cutoff of energy supply to the drive source, the vehicle ordinarily cuts off energy supply to the drive source, e.g., cuts off fuel supply to an engine serving as the drive source, and the travel speed of the vehicle therefore decelerates sharply. On top of this, the transmission ratio is controlled to maximum (low-end ratio) concomitantly with the abrupt deceleration, so that the driver feels a sharp drop in speed.

Therefore, the object of this invention is to provide a control apparatus for a continuously variable transmission that controls transmission ratio so as to keep the input shaft rotational speed actually inputted through an input shaft becomes equal to a desired input shaft rotational speed, eliminates the aforesaid problem and prevents the driver from experiencing an extreme decline in speed owing to increase in input shaft desired rotational speed.

Means for Solving the Problems

In order to achieve the object, as recited in claim 1, this invention is configured to have an apparatus for controlling a continuously variable transmission that is connected to a drive source mounted on a vehicle, changes speed of driving rotation of the drive source inputted through an input shaft at a continuously variable transmission ratio, and transmits the speed of driving rotation to driven wheels through an output shaft, having: a desired input shaft rotational speed calculator that calculates a desired input shaft rotational speed (NDRCMD (NDRMAP)) to be inputted to the continuously variable transmission through the input shaft at every predetermined control cycle based on at least a travel speed of the vehicle, and a transmission ratio controller that controls the transmission ratio of the continuously variable transmission such that an input shaft rotational speed (NDR) actually inputted to the continuously variable transmission through the input shaft becomes equal to the desired input shaft rotational speed, comprising: a comparator that compares a calculated value (NDRCMDZ) of the desired input shaft rotational speed calculated by the desired input shaft rotational speed calculator with a desired input shaft rotational speed upper limit (#NDRCMDMX) that is set in relation to an energy supply cut-off rotational speed (NEFC) defining energy supply cut-off to the drive source; a desired input shaft rotational speed outputter that determines the desired input shaft rotational speed upper limit (#NDRCMDMX) as the desired input shaft rotational speed (NDRCMD) when it is determined by the comparator that the calculated value (NDRCMDZ) does exceed the desired input shaft rotational speed upper limit (#NDRCMDMX), determines the calculated value (NDRCMDZ) as the desired input shaft rotational speed (NDRCMD) when it is determined by the comparator that the calculated value (NDRCMDZ) does not exceed the desired input shaft rotational speed upper limit (#NDRCMDMX), and outputs the determined value to the transmission ratio calculator, wherein the desired input shaft rotational speed calculator includes: a second comparator that compares a provisional value (NDRCMDY) of the calculated value (NDRCMDZ) of the desired input shaft rotational speed with a preceding cycle's desired input shaft rotational speed (NDRCMD) determined by the desired input shaft rotational speed determiner at a preceding control cycle; and a determiner that determines that a sum obtained by adding a difference (DNDRCMDY) between the provisional value (NDRCMDY) and the preceding cycle's desired input shaft rotational speed (NDRCMD) to the preceding cycle's desired input shaft rotational speed (NDRCMD) as the calculated value (NDRCMDZ) when it is determined by the second comparator that the provisional value (NDRCMDY) does not exceed the preceding cycle's desired input shaft rotational speed (NDRCMD) by or more than a desired input shaft rotational speed change amount upper limit (#DNDRMX), and determines that a sum obtained by adding the desired input shaft rotational speed change amount upper limit (#DNDRMX) to the preceding cycle's desired input shaft rotational speed (NDRCMD) as the calculated value (NDRCMDZ) when it is determined by the second comparator that the provisional value (NDRCMDY) does exceed the preceding cycle's desired input shaft rotational speed (NDRCMD) by or more than the desired input shaft rotational speed change amount upper limit (#DNDRMX).

Effects of the Invention

The apparatus for controlling a continuously variable transmission recited in claim 1 is configured to compare the calculated value (NDRCMDZ) of the desired input shaft rotational speed with the desired input shaft rotational speed upper limit (#NDRCMDMX) set in relation to an energy supply cut-off rotational speed (NEFC), determine the desired input shaft rotational speed upper limit (#NDRCMDMX) as the desired input shaft rotational speed (NDRCMD) when it is determined that the calculated value (NDRCMDZ) does exceed the desired input shaft rotational speed upper limit (#NDRCMDMX), determine the calculated value (NDRCMDZ) as the desired input shaft rotational speed (NDRCMD) when it is determined that the calculated value (NDRCMDZ) does not exceed the desired input shaft rotational speed upper limit (#NDRCMDMX), and output the determined value to the transmission ratio calculator. With this, by setting the desired input shaft rotational speed upper limit (#NDRCMDMX) in relation to the energy supply cut-off rotational speed (NEFC), for example, by setting it at or below the energy supply cut-off rotational speed, and by determining the desired input shaft rotational speed upper limit (#NDRCMDMX) as the desired input shaft rotational speed (NDRCMD) when it is determined that the calculated value (NDRCMDZ) does exceed the desired input shaft rotational speed upper limit (#NDRCMDMX), it becomes possible to achieve required energy supply cutoff and to prevent a rotational speed of the drive source that is equivalent to the desired input shaft rotational speed from exceeding the energy supply cut-off rotational speed and increasing further, whereby enabling to prevent the driver from experiencing extreme deceleration.

In the apparatus, it is configured to compare a provisional value (NDRCMDY) of the calculated value (NDRCMDZ) of the desired input shaft rotational speed with a preceding cycle's desired input shaft rotational speed (NDRCMD) determined by the desired input shaft rotational speed determiner at a preceding control cycle; and determine that a sum obtained by adding a difference (DNDRCMDY) between the provisional value (NDRCMDY) and the preceding cycle's desired input shaft rotational speed (NDRCMD) to the preceding cycle's desired input shaft rotational speed (NDRCMD) when it is determined by the second comparator that the provisional value (NDRCMDY) does not exceed the preceding cycle's desired input shaft rotational speed (NDRCMD) by or more than a desired input shaft rotational speed change amount upper limit (#DNDRMX), determine that a sum obtained by adding the desired input shaft rotational speed change amount upper limit (#DNDRMX) to the preceding cycle's desired input shaft rotational speed (NDRCMD) when it is determined by the second comparator that the provisional value (NDRCMDY) does exceed the preceding cycle's desired input shaft rotational speed (NDRCMD) by or more than the desired input shaft rotational speed change amount upper limit (#DNDRMX). With this, in addition to the effect mentioned above, by setting the desired input shaft rotational speed change amount upper limit (#DNDRMX) appropriately, it becomes possible to limit a change amount of the desired input shaft rotational speed within an appropriate range, whereby enabling to limit the rotational speed of the drive source that is equivalent to the desired input shaft rotational speed within an appropriate range and to effectively prevent the driven wheels from being locked even when driving on a road surface where sufficient friction can not be secured between the road surface and driven wheels.

DESCRIPTION OF EMBODIMENTS

An embodiment for implementing a control apparatus for a continuously variable transmission according to this invention are explained with reference to the attached drawings.

Embodiment

Figure 1:
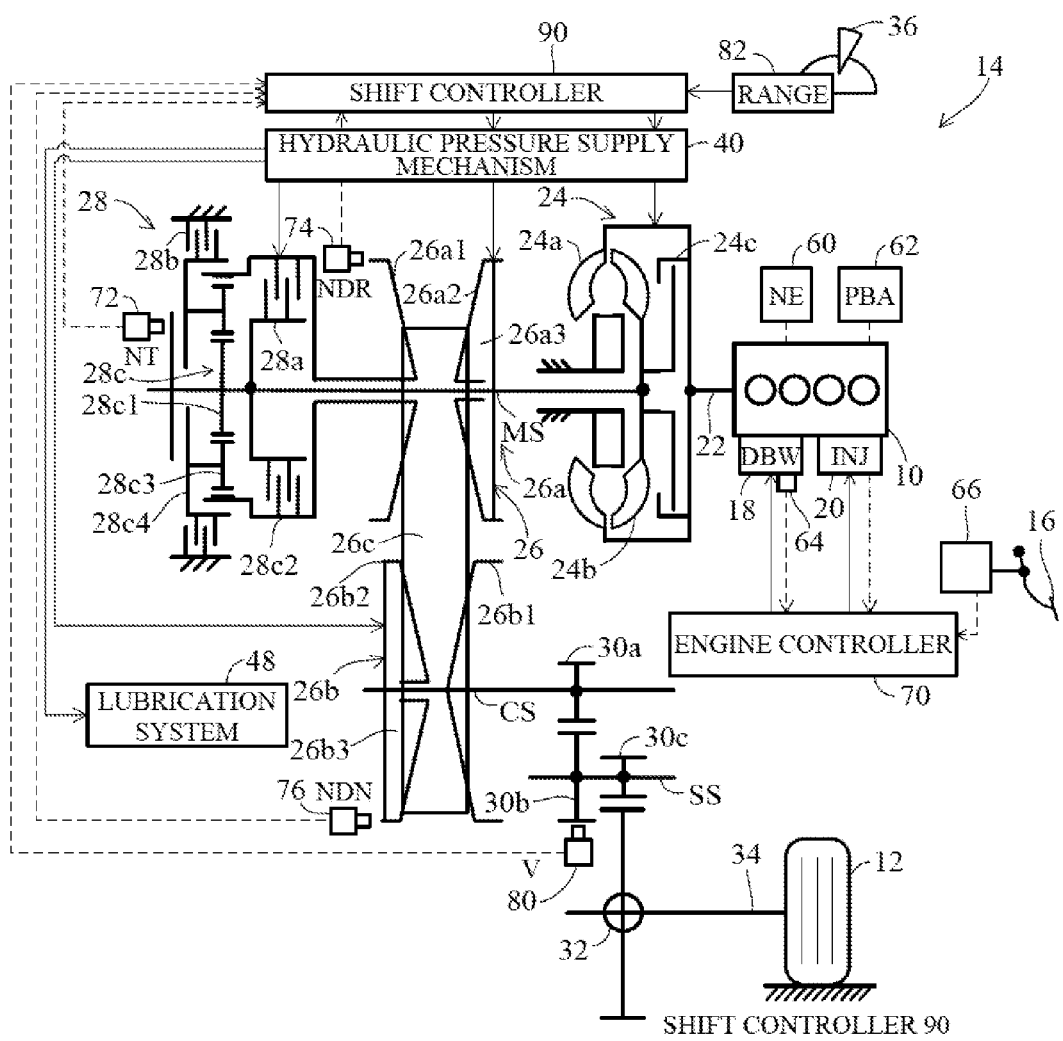
FIG. 1 is a schematic diagram showing an overall view of a control apparatus for a continuously variable transmission according to an embodiment of this invention.

FIG. 1 is a schematic diagram showing an overall view of a control apparatus for a continuously variable transmission according to the embodiment of this invention.

Symbol 10 in FIG. 1 designates an engine (internal combustion engine (drive source)). The engine 10 is mounted in a vehicle 14 provided with driven wheels 12 (the vehicle 14 is indicated partially by the engine 10, driven wheels 12, etc.).

A throttle valve (not shown) installed in an air-intake system of the engine 10 is mechanically disconnected from an accelerator pedal 16 installed on the floor at a vehicle operator's seat and is connected to, and opened/closed by, a DBW (Drive By Wire) DBW mechanism 18 comprising an electric motor or other actuator.

Intake air metered by the throttle valve flows through an intake manifold to be mixed with fuel injected from injectors 20 located near intake ports of respective cylinders to form an air-fuel mixture that flows into the cylinder combustion chambers when intake valves open. In each combustion chamber, the fuel mixture is ignited by a sparkplug and burns, thereby driving a piston and rotating an output shaft 22 connected to a crankshaft, whereafter it is discharged out of the engine 10 as exhaust.

The rotation of the output shaft 22 of the engine 10 is inputted through a torque converter 24 to a Continuously Variable Transmission (automatic transmission, hereinafter sometimes called "CVT") 26. Specifically, the output shaft 22 of the engine 10 is connected to a pump impeller 24a of the torque converter 24, while a turbine-runner 24b installed opposite thereto to receive a fluid (hydraulic oil, CVTF) is connected to a main shaft (input shaft) MS. The torque converter 24 is equipped with a lock-up clutch 24c having a hydraulic mechanism comprising a piston slidable inside a cylinder.

The CVT 26 comprises a drive (DR) pulley 26a fitted on the main shaft MS, more exactly on a peripheral side shaft thereof, a driven (DN) pulley 26b fitted on a countershaft (output shaft) CS which is parallel to the main shaft MS and connected to the driven wheels 12, more exactly on a peripheral side shaft thereof, and an endless transmission element wound around the drive and driven pulleys, e.g., a metal belt 26c.

The drive pulley 26a comprises a fixed pulley half 26a1 fitted on the peripheral side shaft of the main shaft MS to be incapable of relative rotation and of axial direction movement, a movable pulley half 26a2 incapable of rotation relative to the peripheral side shaft of the main shaft MS and capable of relative movement in the axial direction with respect to the fixed pulley half 26a1, and a hydraulic mechanism 26a3 comprising a piston, cylinder and spring, and installed on a side of the movable pulley half 26a2 to press the movable pulley half 26a2 toward the fixed pulley half 26a1 when supplied with hydraulic pressure (hydraulic oil (CVTF) pressure).

The driven pulley 26b comprises a fixed pulley half 26b1 fitted on a peripheral side shaft of the countershaft CS to be incapable of relative rotation and of axial direction movement, a movable pulley half 26b2 incapable of rotation relative to the countershaft CS and capable of relative movement in the axial direction with respect to the fixed pulley half 26b1, and a hydraulic mechanism 26b3 comprising a piston, cylinder and spring and installed on a side of the movable pulley half 26b2 to press the movable pulley half 26b2 toward the fixed pulley half 26b1 when supplied with hydraulic pressure.

The CVT 26 is connected to the engine 10 through a forward-reverse switching mechanism 28. The forward-reverse switching mechanism 28 comprises a forward clutch 28a that enables the vehicle 14 to travel forward, a reverse brake-clutch 28b that enables reverse travel, and a planetary gear set 28c located between the two clutches. The CVT 26 is connected to the engine 10 through the forward clutch 28a. The forward clutch 28a and reverse brake-clutch 28b are each equipped with a pressure mechanism comprising a piston slidable inside a cylinder.

In the planetary gear set 28c, a sun gear 28c1 is fixed on the main shaft MS and a ring gear 28c2 is fixed on the fixed pulley half 26a1 of the drive pulley 26a through the forward clutch 28a. A pinion 28c3 is installed between the sun gear 28c1 and the ring gear 28c2. The pinion 28c3 is connected to the sun gear 28c1 by a carrier 28c4. When the reverse brake-clutch 28b is operated, the carrier 28c4 is fixed (locked) as a result.

The rotation of the countershaft CS is transmitted from a secondary shaft (intermediate shaft) SS to the driven wheels 12 through gears. Specifically, the rotation of the countershaft CS is transmitted through gears 30a, 30b to the secondary shaft SS, and the rotation of the secondary shaft SS is transmitted through a gear 30c and to the left and right driven wheels (only the right wheel shown) 12 from a differential 32 through driveshafts 34.

Thus, the CVT 26 is on the one hand connected to the engine 10 through the torque converter 24 and is on the other connected to the driven wheels 12 through the forward-reverse switching mechanism 28. The drive/driven pulleys 26a/26b of the CVT 26, the lock-up clutch 24c of the torque converter 24, and the forward clutch 28a (and reverse brake-clutch 28b) of the forward-reverse switching mechanism 28 are, as indicated above, equipped with the hydraulic mechanisms 26a3, 26b3 and the like, and, therefore, the drive/driven pulleys 26a/26b of the CVT 26, the lock-up clutch 24c of the torque converter 24, and the forward clutch 28c (and reverse brake-clutch 28b) of the forward-reverse switching mechanism 28 are hereinafter called hydraulic actuators.

The operator switches between the forward clutch 28a and the reverse brake-clutch 28b in the forward-reverse switching mechanism 28 by operating a range selector 36 provided at the vehicle operator's seat so as to select a range from among P, R, N and D, for example. The range selection by the operator's operation of the range selector 36 is transmitted to a manual valve of a hydraulic pressure supply mechanism 40.

Although omitted in the drawings, the hydraulic pressure supply mechanism 40 comprises, inter alia, a hydraulic pump for pumping hydraulic oil from a reservoir and discharging the hydraulic oil, hydraulic pressure demand sites comprising hydraulic actuators (namely, the hydraulic mechanisms 26a3 and 26b3 of the CVT 26, the forward clutch 28c (and reverse brake-clutch 28b) of the forward-reverse switching mechanism 28, and the lock-up clutch 24c of the torque converter 24), and a lubrication system of the CVT 26 (designated by symbol 48 in FIG. 1), and numerous electromagnetic solenoids installed in oil passages connecting the hydraulic pressure demand sites and a delivery port of the hydraulic pump for regulating amount (hydraulic pressure) of hydraulic oil to be supplied to the hydraulic pressure demand sites.

More specifically, the hydraulic pressure supply mechanism 40 supplies hydraulic pressure to the hydraulic mechanism 26a3 and 26b3 of the CVT 26 to move the movable pulley half 26a2 and 26b2 in the axial direction, vary the pulley widths between the drive/driven pulleys 26a/26b and vary the winding radius of the belt 26c, thereby continuously varying the transmission ratio (speed ratio) at which the rotation of the engine 10 is transmitted to the driven wheels 12.

Further, the hydraulic pressure supply mechanism 40 supplies hydraulic pressure to the lock-up clutch 24c of the torque converter 24 in accordance with the operating condition to engage and disengage the lock-up clutch 24c, and hydraulic pressure is supplied through a manual valve responsive to the position of the range selector 36 selected by the operator and applied to the forward clutch 28a or reverse brake-clutch 28b of the forward-reverse switching mechanism 28, thereby enabling the vehicle 14 to drive forward or backward.

Returning to the explanation of FIG. 1, a crank angle sensor 60 provided at a suitable location, such as near a cam shaft (not shown) of the engine 10, outputs a signal indicating engine speed NE once every predetermined piston crank angle position. A manifold absolute pressure sensor 62 provided in the air-intake system at a suitable position downstream of the throttle valve outputs a signal proportional to the manifold absolute pressure PBA inside the air-intake pipe (engine load).

A throttle opening sensor 64 provided at the actuator of the DBW mechanism 18 utilizes the amount of actuator rotation to output a signal proportional to throttle valve opening TH, and an accelerator pedal depression sensor 66 provided near the accelerator pedal 16 outputs a signal proportional to accelerator pedal depression AP corresponding to the amount of depression of the accelerator pedal 16 (amount of accelerator pedal operation) by the operator.

The outputs of the crank angle sensor 60 and other sensors are sent to an engine controller 70. The engine controller 70, which is equipped with a microcomputer comprising a CPU, ROM, RAM, I/O and the like, controls the operation of the DBW mechanism 18 in accordance with the outputs of these sensors and controls fuel injection using the injectors 20 and ignition timing using an ignition device.

Moreover, when engine speed NE becomes equal to or greater than an F/C engine speed (Fuel Cut (energy (fuel) supply cut-off) engine speed) NEFC, the engine controller 70 stops fuel injection (fuel supply) to the engine 10.

An NT sensor (rotational speed sensor) 72 provided on the main shaft MS outputs a pulse signal indicating rotational speed NT of the main shaft MS (transmission input shaft rotational speed), and an NDR sensor (rotational speed sensor) 74 provided at a suitable location near the drive pulley 26a of the CVT 26 outputs a pulse signal in accordance with input shaft rotational speed NDR of the drive pulley 26a.

Further, an NDN sensor (rotational speed sensor) 76 provided at a suitable location near the driven pulley 26b outputs a pulse signal indicating rotational speed NDN of the driven pulley 26b (transmission output shaft rotational speed), and a vehicle speed sensor (rotational speed sensor) 80 provided near the gear 30b of the secondary shaft SS outputs a pulse signal indicating the rotational speed and rotational direction of the secondary shaft SS (specifically, a pulse signal indicating vehicle speed V).

Moreover, a range selector switch 82 provided near the range selector 36 outputs a signal in accordance with the P, R, N, D or other range selected by the operator.

The outputs of the NT sensor 72 and other sensors mentioned above are sent to a shift controller 90. The shift controller 90 is also equipped with a microcomputer comprising a CPU, ROM, RAM, I/O and the like and is configured to communicate with the engine controller 70.

The shift controller 90 controls the operation of the forward-reverse switching mechanism 28 and the torque converter 24, and also controls the operation of the CVT 26.

Figure 2:
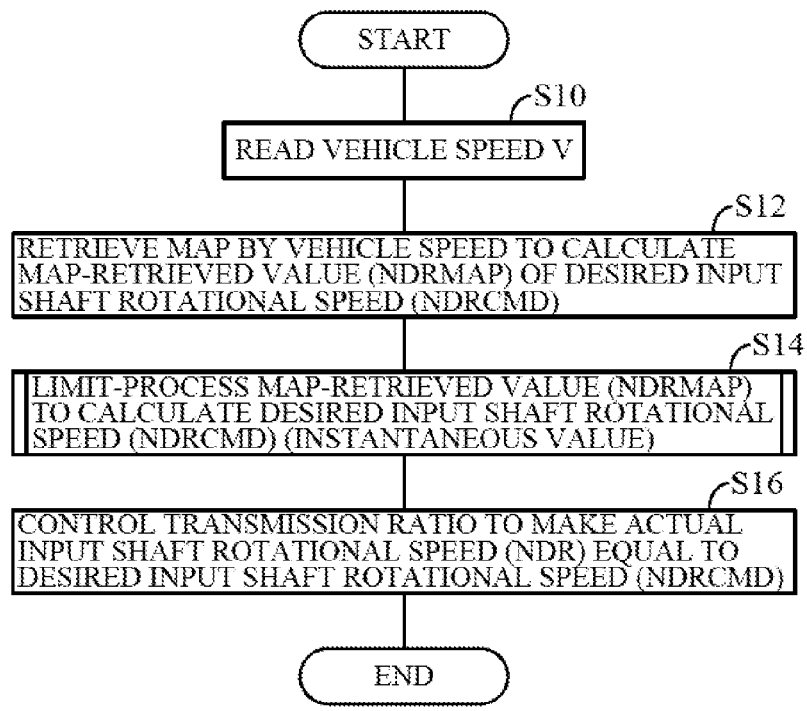
FIG. 2 is a flowchart showing operation of the apparatus shown in FIG. 1.

FIG. 2 is a flowchart showing the operation of the shift controller 90 on the CVT 26. The program shown is executed at a predetermined control cycle of, for example, 10 milliseconds.

Figure 3:
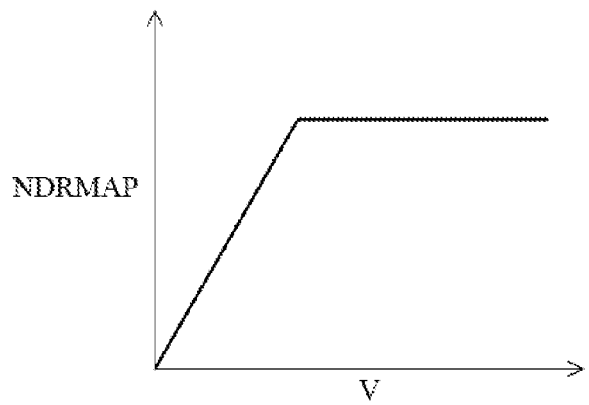
FIG. 3 is an explanatory diagram showing map characteristics used for retrieving a desired input shaft rotational speed NDRCMD in FIG. 2 flowchart.

Now to explain, in S10, the vehicle speed V detected from the vehicle speed sensor 80 is read, whereafter the program proceeds to S12, in which a desired input shaft rotational speed NDRCMD is calculated by retrieval from a pre-established map whose characteristics are shown in FIG. 3 using the detected vehicle speed V as address data. Specifically, a map-retrieved value NDRMAP of the desired input shaft rotational speed to be inputted from the engine 10 through the main shaft MS to the CVT 26 is calculated every control cycle based on at least the vehicle speed V.

Although not shown in FIG. 3, the map-retrieved value NDRMAP of the desired input shaft rotational speed is actually retrieved based on the vehicle speed V and the accelerator pedal depression AP detected by the accelerator pedal depression sensor 66.

The program next proceeds to S14, in which the calculated map-retrieved value NDRMAP of the desired input shaft rotational speed is subjected to limit-processing (discussed below) to calculate an instantaneous value NDRCMD of the desired input shaft rotational speed. The program next proceeds to S16, in which the transmission ratio of the CVT 26 is controlled based on the calculated instantaneous value NDRCMD of the desired input shaft rotational speed.

Thus in this embodiment, the desired input shaft rotational speed obtained by map retrieval is denoted NDRMAP, and the instantaneous value of the desired input shaft rotational speed in every control cycle obtained thereafter by limit-processing is denoted NDRCMD. In the following, the addition of "instantaneous value" is omitted from NDRCMD.

The processing in S16 is specifically to feedback control the transmission ratio (speed ratio) of the CVT 26 so that the input shaft rotational speed NDR actually inputted to the CVT 26 (substantially equal to engine speed), detected from the NDR sensor 74, becomes equal to the desired input shaft rotational speed NDRCMD, still more concretely, to control the transmission ratio to the high side when the detected NDR is equal to or greater than the desired NDRCMD and control the transmission ratio to the low side when the detected NDR is less than the desired NDRCMD.

Figure 4:
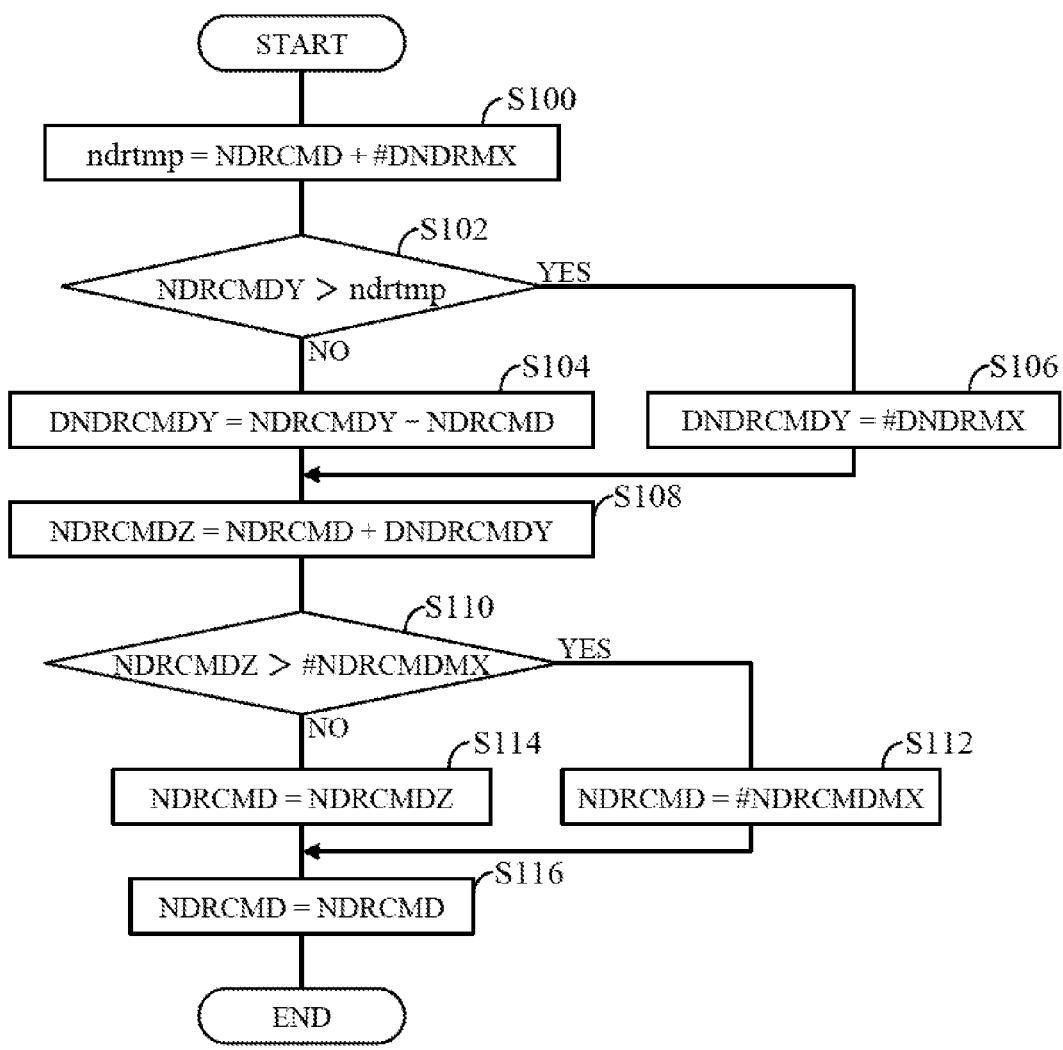
FIG. 4 is a sub-routine flowchart showing limit-processing of the desired input shaft rotational speed of FIG. 2 flowchart.

FIG. 4 is a sub-routine flowchart showing the limit-processing of the desired input shaft rotational speed NDRCMD of FIG. 2, and FIG. 5 is a time chart for explaining this processing.

Now to explain, in S100, a preceding cycle's desired input shaft rotational speed NDRCMD determined by the processing of S14 of the flowchart of FIG. 2 performed one or more control cycles earlier, specifically, 30 milliseconds earlier, and a desired input shaft rotational speed change amount upper limit #DNDRMX are added to calculate a sum "ndrtmp", whereafter the program proceeds to S102, in which a provisional value NDRCMDY of the calculated value (value calculated at the control cycle) of the desired input shaft rotational speed is compared with the sum "ndrtmp" to determine whether the provisional value exceeds the sum.

Specifically, the provisional value NDRCMDY of the calculated value of the desired input shaft rotational speed is compared with the preceding cycle's desired input shaft rotational speed NDRCMD to determine whether the provisional value NDRCMDY exceeds the preceding cycle's desired input shaft rotational speed NDRCMD by, or more than, the desired input shaft rotational speed change amount upper limit #DNDRMX. The desired input shaft rotational speed change amount upper limit #DNDRMX is a fixed value suitably determined empirically. (Values prefaced by the symbol # in the flowchart of FIG. 4 are fixed values.)

When the result in S102 is NO, i.e., when it is determined that the provisional value NDRCMDY does not exceed the preceding cycle's desired input shaft rotational speed NDRCMD by, or more than, the desired input shaft rotational speed change amount upper limit #DNDRMX, the program proceeds to S104, in which the preceding cycle's desired input shaft rotational speed NDRCMD is subtracted from the provisional value NDRCMDY to calculate an interval value DNDRCMDY.

The interval value DNDRCMDY is the difference between the provisional value NDRCMDY and preceding cycle's desired input shaft rotational speed NDRCMD, namely, is the difference between the current cycle value and the preceding cycle's desired input shaft rotational speed.

The program next proceeds to S108, in which the sum obtained by adding the interval value DNDRCMDY to the preceding cycle's desired input shaft rotational speed NDRCMD is treated or deemed as a calculated value NDRCMDZ. In other words, when it is determined that the provisional value NDRCMDY does not exceed the preceding cycle's desired input shaft rotational speed NDRCMD by, or more than, the desired input shaft rotational speed change amount upper limit #DNDRMX, the value obtained by adding the difference DNDRCMDY between the provisional value NDRCMDY and the preceding cycle's desired input shaft rotational speed NDRCMD to the preceding cycle's desired input shaft rotational speed NDRCMD is determined as the calculated (current cycle's) value NDRCMDZ.

On the other hand, when the result in S102 is YES, i.e., when it is determined that the provisional value NDRCMDY exceeds the preceding cycle's desired input shaft rotational speed NDRCMD by, or more than, the desired input shaft rotational speed change amount upper limit #DNDRMX, the program proceeds to S106, in which the desired input shaft rotational speed change amount upper limit #DNDRMX is itself adopted as the interval value, whereafter the program proceeds to S108, in which the sum obtained by adding the interval value DNDRCMDY to the preceding cycle's desired input shaft rotational speed NDRCMD is treated or deemed as a calculated value NDRCMDZ.

In other words, when the result in S102 is NO and it is determined that the provisional value NDRCMDY does not exceed the preceding cycle's desired input shaft rotational speed NDRCMD by, or more than, the desired input shaft rotational speed change amount upper limit #DNDRMX, the value obtained by adding the desired input shaft rotational speed change amount upper limit #DNDRMX to the preceding cycle's desired input shaft rotational speed NDRCMD is determined as the calculated value NDRCMDZ.

The program next proceeds to S110, in which the calculated value NDRCMDZ of the desired input shaft rotational speed is compared with a desired input shaft rotational speed upper limit #NDRCMDMX to determine whether the calculated value exceeds the desired input shaft rotational speed upper limit #NDRCMDMX.

FIG. 5 shows energy supply cut-off rotational speed NEFC that defines the speed at which energy (fuel) supply to the engine 10 is to be cut off, and the desired input shaft rotational speed upper limit #NDRCMDMX is set in relation to energy supply cut-off rotational speed NEFC, more specifically, the desired input shaft rotational speed upper limit #NDRCM- DMX is set so that the engine speed NE becomes equal to or smaller than the energy supply cut-off rotational speed NEFC.

Thus in S110, the calculated value NDRCMDZ of the desired input shaft rotational speed is compared with the desired input shaft rotational speed upper limit #NDRCMDMX set in relation to the energy supply cut-off rotational speed NEFC that defines the speed at which fuel supply to the engine 10 is to be cut off.

When the result in S110 is YES, i.e., when it is determined that the calculated value NDRCMDZ of the desired input shaft rotational speed exceeds the desired input shaft rotational speed upper limit #NDRCMDMX, the program proceeds to S112, in which the desired input shaft rotational speed upper limit #NDRCMDMX is determined as the desired input shaft rotational speed NDRCMD.

On the other hand, when the result in S110 is NO, i.e., when it is determined that the calculated value NDRCMDZ does not exceed the desired input shaft rotational speed upper limit #NDRCMDMX, the program proceeds to S114, in which the calculated value NDRCMDZ is determined as the desired input shaft rotational speed NDRCMD.

The program next proceeds to S116, in which the determined desired input shaft rotational speed NDRCMD is outputted. As a result, the transmission ratio of the CVT 26 is controlled based on the value limit-processed in S16 of the flowchart of FIG. 2.

As stated above, the embodiment is configured to have an apparatus (shift controller 90) for controlling a continuously variable transmission (CVT) (26) that is connected to a drive source (internal combustion engine) (10) mounted on a vehicle (14), changes speed of driving rotation of the drive source inputted through an input shaft (main shaft) MS at a continuously variable transmission ratio (ratio), and transmits the speed of driving rotation to driven wheels (12) through an output shaft (counter shaft) CS, having: a desired input shaft rotational speed calculator (S10-S14) that calculates a desired input shaft rotational speed (NDRCMD (NDRMAP)) to be inputted to the continuously variable transmission through the input shaft at every predetermined control cycle based on at least a travel speed of the vehicle, and a transmission ratio controller (S16) that controls the transmission ratio of the continuously variable transmission such that an input shaft rotational speed (NDR) actually inputted to the continuously variable transmission through the input shaft becomes equal to the desired input shaft rotational speed, comprising: a comparator (S14, S110) that compares a calculated value (NDRCMDZ) of the desired input shaft rotational speed calculated by the desired input shaft rotational speed calculator with a desired input shaft rotational speed upper limit (#NDRCMDMX) that is set in relation to an energy supply cut-off rotational speed (NEFC) defining energy supply cut-off to the drive source; a desired input shaft rotational speed outputter (S112-S116) that determines the desired input shaft rotational speed upper limit (#NDRCMDMX) as the desired input shaft rotational speed (NDRCMD) when it is determined by the comparator that the calculated value (NDRCMDZ) does exceed the desired input shaft rotational speed upper limit (#NDRCMDMX), determines the calculated value (NDRCMDZ) as the desired input shaft rotational speed (NDRCMD) when it is determined by the comparator that the calculated value (NDRCMDZ) does not exceed the desired input shaft rotational speed upper limit (#NDRCMDMX), and outputs the determined value to the transmission ratio calculator. With this, by setting the desired input shaft rotational speed upper limit (#NDRCMDMX) in relation to the energy supply cut-off rotational speed (NEFC), for example, by setting it at or below the energy supply cut-off rotational speed, and by determining the desired input shaft rotational speed upper limit (#NDRCMDMX) as the desired input shaft rotational speed (NDRCMD) when it is determined that the calculated value (NDRCMDZ) does exceed the desired input shaft rotational speed upper limit (#NDRCMDMX), it becomes possible to obtain required driving force limit (achieve required energy supply cutoff) and to prevent a rotational speed of the drive source that is equivalent to the desired input shaft rotational speed from exceeding the energy supply cut-off rotational speed and increasing further excessively, whereby enabling to prevent a driver from experiencing extreme deceleration.

Figure 5A:
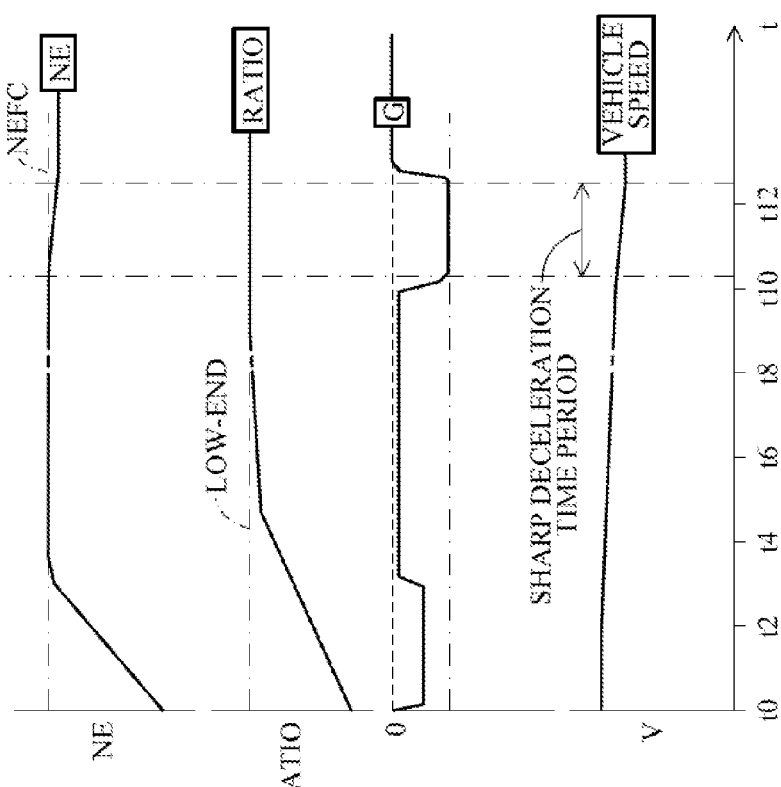
FIGS. 5A and 5B is a set of time charts for explaining operation shown in FIG. 4 sub-routine flowchart.
Figure 5B:
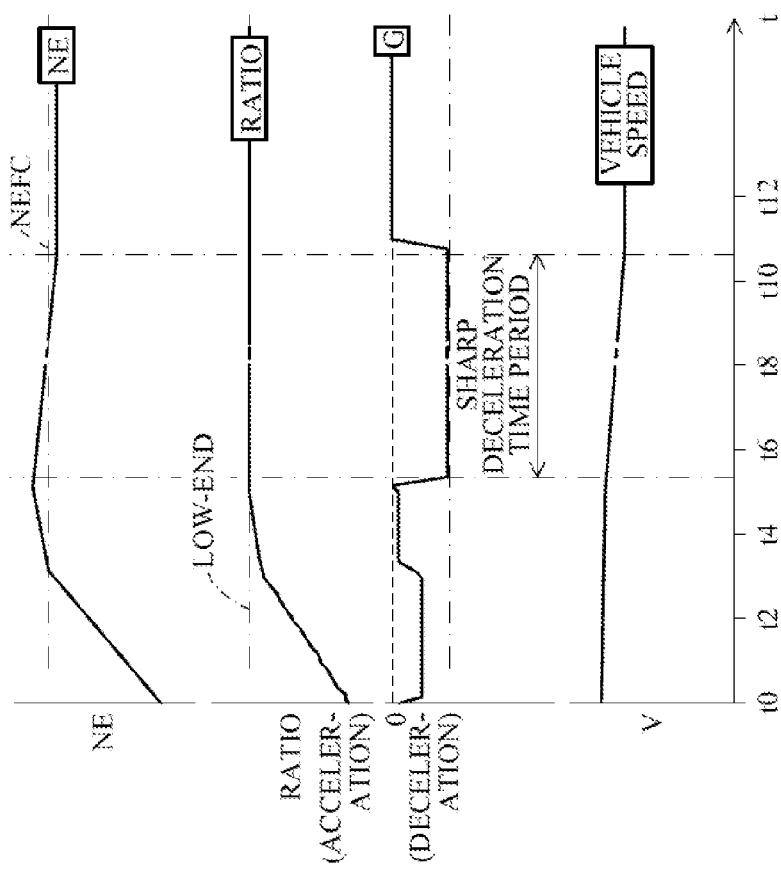

FIG. 5A is a time chart showing deceleration state of the vehicle 14 where the limit-processing of the desired input shaft rotational speed NDRCMD of the FIG. 4 flowchart according to the embodiment is not conducted, and FIG. 5B is a time chart showing the deceleration state of the vehicle 14 where the limit-processing is conducted.

As shown in FIG. 5A, when the engine speed NE exceeds the energy supply cut-off rotational speed NEFC at time t3, since the fuel supply to the engine 10 is cut off, the vehicle speed V begins to decrease by the fuel supply cut-off at time t4 or thereabound. In addition, since the speed ratio (transmission ratio) is controlled to the low-end in response thereto from time t5, a time period up to time t11 or thereabound becomes a sharp deceleration time period. This may sometimes give the driver an extreme decline in speed.

On the other hand, since the embodiment is configured as mentioned above, as shown in FIG. 5B, it becomes possible to prevent the engine speed NE that is equivalent to the desired input shaft rotational speed (NDRCMD) from exceeding the energy supply cut-off rotational speed (NEFC) and increasing further excessively, whereby enabling to avoid unnecessary fuel supply cut off to the engine 10. With this, since decreasing of the vehicle speed V becomes slower than the case shown in FIG. 5A, the time at which the speed ratio is controlled to the low-end becomes a time point passing time t10. Accordingly, the sharp deceleration time period becomes a short period up to time t13 or thereabound, and hence, it becomes possible to prevent the driver from experiencing extreme deceleration.

To be more specific, the embodiment is configured in the foregoing manner and to shorten the fuel supply cut-off time period, whereby preventing the driver from experiencing extreme deceleration.

Further, as shown in FIG. 5B, G, i.e., the acceleration that acts in the direction in which the vehicle 14 advances can be made smoother than the case shown in FIG. 5A. This can improve driving feeling.

Further, it is configured such that the desired input shaft rotational speed outputter includes: a second comparator (S14, S100, S102) that compares a provisional value (NDRCMDY) of the calculated value (NDRCMDZ) of the desired input shaft rotational speed with a preceding cycle's desired input shaft rotational speed (NDRCMD) at a preceding control cycle; and a determiner that determines a sum obtained by adding a difference (DNDRCMDY) between the provisional value (NDRCMDY) and the preceding cycle's desired input shaft rotational speed (NDRCMD) to the preceding cycle's desired input shaft rotational speed (NDRCMD) as the calculated value (NDRCMDZ) when it is determined by the second comparator that the provisional value (NDRCMDY) does not exceed the preceding cycle's desired input shaft rotational speed (NDRCMD) by or more than a desired input shaft rotational speed change amount upper limit (#DNDRMX) (S104, S108), determines that a sum obtained by adding the desired input shaft rotational speed change amount upper limit (#DNDRMX) to the preceding cycle's desired input shaft rotational speed (NDRCMD) as the calculated value (NDRCMDZ) when it is determined by the second comparator that the provisional value (NDRCMDY) does exceed the preceding cycle's desired input shaft rotational speed (NDRCMD) by or more than the desired input shaft rotational speed change amount upper limit (#DNDRMX) (S104, S106, S108). With this, in addition to the effect mentioned above, by setting the desired input shaft rotational speed change amount upper limit (#DNDRMX) appropriately, it becomes possible to limit a change amount of the desired input shaft rotational speed within an appropriate range, whereby enabling to limit the rotational speed of the drive source that is equivalent to the desired input shaft rotational speed within an appropriate range and to prevent the driven wheels 12 from being locked effectively even when driving on a road surface where sufficient friction can not be secured between the road surface and driven wheels 12.

In the apparatus, the desired input shaft rotational speed upper limit (#NDRCMDMX) is set to be equal to or smaller than the energy supply cut-off rotational speed (NEFC).

In the apparatus, the desired input shaft rotational speed calculator calculates the desired input shaft rotational speed (NDRCMD (NDRMAP)) based on the travel speed and accelerator position of the vehicle (14).

It should be noted in the above that, although the engine 10 is exemplified as the drive source, the configuration should not be limited thereto. The drive source can be a hybrid of an engine and electric motor, or an electric motor itself.

INDUSTRIAL APPLICABILITY

According to the invention, the apparatus is configured to compare the calculated value (NDRCMDZ) of the desired input shaft rotational speed with the desired input shaft rotational speed upper limit (#NDRCMDMX) set in relation to an energy supply cut-off rotational speed (NEFC), determine the desired input shaft rotational speed upper limit (#NDRCMDMX) as the desired input shaft rotational speed (NDRCMD) when it is determined that the calculated value does exceed the desired input shaft rotational speed upper limit, and determine the calculated value (NDRCMDZ) as the desired input shaft rotational speed (NDRCMD) when it is determined that the calculated value does not exceed the desired input shaft rotational speed upper limit (#NDRCMDMX), whereby enabling to prevent a driver from experiencing extreme deceleration by increase of the desired input shaft rotational speed.

DESCRIPTION OF SYMBOLS 10 engine (internal combustion engine; drive source), 12 driven wheels, 14 vehicle, 16 accelerator pedal, 18 DBW mechanism, 24 torque converter, 24c lock-up clutch, 26 Continuously Variable Transmission (CVT), 26a, 26b drive/driven pulley, 26a3, 26b3 hydraulic mechanism, 28 forward-reverse switching mechanism, 28a forward clutch, 40 hydraulic pressure supply mechanism, 48 lubrication system, 70 engine controller, 90 shift controller

The invention claimed is:

1. An apparatus for controlling a continuously variable transmission that is connected to a drive source mounted on a vehicle, changes speed of driving rotation of the drive source inputted through an input shaft at a continuously variable transmission ratio, and transmits the speed of driving rotation to driven wheels through an output shaft, having:

a desired input shaft rotational speed calculator that calculates a desired input shaft rotational speed (NDRCMD (NDRMAP)) to be inputted to the continuously variable transmission through the input shaft at every predetermined control cycle based on at least a travel speed of the vehicle, and a transmission ratio controller that controls the transmission ratio of the continuously variable transmission such that an input shaft rotational speed (NDR) actually inputted to the continuously variable transmission through the input shaft becomes equal to the desired input shaft rotational speed, comprising:

a comparator that compares a calculated value (NDRCMDZ) of the desired input shaft rotational speed calculated by the desired input shaft rotational speed calculator with a desired input shaft rotational speed upper limit (#NDRCMDMX) that is set in relation to an energy supply cut-off rotational speed (NEFC) defining energy supply cut-off to the drive source;

a desired input shaft rotational speed outputter that determines the desired input shaft rotational speed upper limit (#NDRCMDMX) as the desired input shaft rotational speed (NDRCMD) when it is determined by the comparator that the calculated value (NDRCMDZ) does exceed the desired input shaft rotational speed upper limit (#NDRCMDMX), determines the calculated value (NDRCMDZ) as the desired input shaft rotational speed (NDRCMD) when it is determined by the comparator that the calculated value (NDRCMDZ) does not exceed the desired input shaft rotational speed upper limit (#NDRCMDMX), and outputs the determined value to the transmission ratio calculator, wherein the desired input shaft rotational speed outputter includes:

a second comparator that compares a provisional value (NDRCMDY) of the calculated value (NDRCMDZ) of the desired input shaft rotational speed with a preceding cycle's desired input shaft rotational speed (NDRCMD) at a preceding control cycle; and a determiner that determines that a sum obtained by adding a difference (DNDRCMDY) between the provisional value (NDRCMDY) and the preceding cycle's desired input shaft rotational speed (NDRCMD) to the preceding cycle's desired input shaft rotational speed (NDRCMD) as the calculated value (NDRCMDZ) when it is determined by the second comparator that the provisional value (NDRCMDY) does not exceed the preceding cycle's desired input shaft rotational speed (NDRCMD) by or more than a desired input shaft rotational speed change amount upper limit (#DNDRMX), determines that a sum obtained by adding the desired input shaft rotational speed change amount upper limit (#DNDRMX) to the preceding cycle's desired input shaft rotational speed (NDRCMD) as the calculated value (NDRCMDZ) when it is determined by the second comparator that the provisional value (NDRCMDY) does exceed the preceding cycle's desired input shaft rotational speed (NDRCMD) by or more than the desired input shaft rotational speed change amount upper limit (#DNDRMX).

2. The apparatus according to claim 1, wherein the desired input shaft rotational speed upper limit (#NDRCMDMX) is set to be equal to or smaller than the energy supply cut-off rotational speed (NEFC).

3. The apparatus according to claim 1, wherein the desired input shaft rotational speed calculator calculates the desired input shaft rotational speed (NDRCMD (NDRMAP)) based on the travel speed and accelerator position of the vehicle.

4. A method for controlling a continuously variable transmission that is connected to a drive source mounted on a vehicle, changes speed of driving rotation of the drive source inputted through an input shaft at a continuously variable transmission ratio, and transmits the speed of rotation to driven wheels through an output shaft, comprising the steps of:
calculating a desired input shaft rotational speed (NDRCMD (NDRMAP)) to be inputted to the continuously variable transmission through the input shaft at every predetermined control cycle based on at least a travel speed of the vehicle;
controlling the transmission ratio of the continuously variable transmission such that an input shaft rotational speed (NDR) actually inputted to the continuously variable transmission through the input shaft becomes equal to the desired input shaft rotational speed;
comparing a calculated value (NDRCMDZ) of the desired input shaft rotational speed calculated by the step of desired input shaft rotational speed calculating with a desired input shaft rotational speed upper limit (#NDRCMDMX) that is set in relation to an energy supply cut-off rotational speed (NEFC) defining energy supply cut-off to the drive source;
determining the desired input shaft rotational speed upper limit (#NDRCMDMX) as the desired input shaft rotational speed (NDRCMD) when it is determined by the step of comparing that the calculated value (NDRCMDZ) does exceed the desired input shaft rotational speed upper limit (#NDRCMDMX);
determining the calculated value (NDRCMDZ) as the desired input shaft rotational speed (NDRCMD) when it is determined by the step of comparing that the calculated value (NDRCMDZ) does not exceed the desired input shaft rotational speed upper limit (#NDRCMDMX); and outputting the determined value to the step of transmission ratio calculating, wherein the step of desired input shaft rotational speed outputting includes the steps of:
comparing a provisional value (NDRCMDY) of the calculated value (NDRCMDZ) of the desired input shaft rotational speed with a preceding cycle's desired input shaft rotational speed (NDRCMD) at a preceding control cycle; and
determining that a sum obtained by adding a difference (DNDRCMDY) between the provisional value (NDRCMDY) and the preceding cycle's desired input shaft rotational speed (NDRCMD) to the preceding cycle's desired input shaft rotational speed (NDRCMD) as the calculated value (NDRCMDZ) when it is determined by the step of second comparing that the provisional value (NDRCMDY) does not exceed the preceding cycle's desired input shaft rotational speed (NDRCMD) by or more than a desired input shaft rotational speed change amount upper limit (#DNDRMX);
determining that a sum obtained by adding the desired input shaft rotational speed change amount upper limit (#DNDRMX) to the preceding cycle's desired input shaft rotational speed (NDRCMD) as the calculated value (NDRCMDZ) when it is determined by the step of comparing that the provisional value (NDRCMDY) does exceed the preceding cycle's desired input shaft rotational speed (NDRCMD) by or more than the desired input shaft rotational speed change amount upper limit (#DNDRMX).

5. The method according to claim 4, wherein the desired input shaft rotational speed upper limit (#NDRCMDMX) is set to be equal to or smaller than the energy supply cut-off rotational speed (NEFC).

6. The method according to claim 4, wherein the step of desired input shaft rotational speed calculating calculates the desired input shaft rotational speed (NDRCMD (NDRMAP)) based on the travel speed and accelerator position of the vehicle.

* * * * *